(12) United States Patent
Amidon et al.

(10) Patent No.: US 7,992,171 B2
(45) Date of Patent: Aug. 2, 2011

(54) SYSTEM AND METHOD FOR CONTROLLED VIRAL DISTRIBUTION OF DIGITAL CONTENT IN A SOCIAL NETWORK

(75) Inventors: Christopher Amidon, Apex, NC (US); Alfredo Issa, Apex, NC (US); Richard Walsh, Raleigh, NC (US); Sid Stafford, Durham, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 622 days.

(21) Appl. No.: 11/516,294

(22) Filed: Sep. 6, 2006

(65) Prior Publication Data

US 2008/0059992 A1    Mar. 6, 2008

(51) Int. Cl.
*H04N 5/445* (2006.01)
(52) U.S. Cl. ............... 725/50; 726/31; 726/2; 380/201; 705/10
(58) Field of Classification Search .............. 707/3, 200, 707/202; 726/31, 2; 380/201; 705/10; 725/50
See application file for complete search history.

(56) References Cited

U.S. PATENT DOCUMENTS

| | | | |
|---|---|---|---|
| 5,220,657 A | | 6/1993 | Bly et al. |
| 5,517,617 A | | 5/1996 | Sathaye et al. |
| 5,537,586 A | | 7/1996 | Amram et al. |
| 5,629,980 A | | 5/1997 | Stefik et al. |
| 5,857,077 A | | 1/1999 | Nakagaki et al. |
| 5,884,035 A | | 3/1999 | Butman et al. |
| 5,892,900 A | * | 4/1999 | Ginter et al. ............... 726/26 |
| 6,073,138 A | | 6/2000 | de l'Etraz et al. |
| 6,088,702 A | | 7/2000 | Plantz et al. |
| 6,149,441 A | * | 11/2000 | Pellegrino et al. ............ 434/350 |
| 6,260,069 B1 | | 7/2001 | Anglin |
| 6,314,409 B2 | | 11/2001 | Schneck et al. |
| 6,338,086 B1 | | 1/2002 | Curtis et al. |
| 6,389,541 B1 | | 5/2002 | Patterson |

(Continued)

FOREIGN PATENT DOCUMENTS

JP    2005100325 A    4/2005

(Continued)

OTHER PUBLICATIONS

International Search Report and Written Opinion for PCT/US07/77185 mailed Mar. 18, 2008.

(Continued)

*Primary Examiner* — Christopher Kelley
*Assistant Examiner* — Sahar A Baig
(74) *Attorney, Agent, or Firm* — Withrow & Terranova, PLLC

(57) ABSTRACT

A controlled content distribution system (CCDS) employs a peer-level application into which a content producer can import digital content (e.g., video, audio, graphic, image, text, code files, etc.) The content producer identifies distribution parameters including an initial distribution list and a level limit representing the maximum number of levels, or degrees of separation for allowed distribution in a FOAF social network. Distribution parameters also include an alteration definition for one or more allowable levels in the network. Alteration definitions may identify a file degradation characteristic, file augmentation, or deletion parameter for altering the digital content from its original form. Alteration definitions often vary at each level. A distribution package is created by the CCDS and includes the digital content, a configuration data file, a key ID and a license key seed. The distribution package is processed at a FOAF license server before being sent to additional content recipients.

30 Claims, 7 Drawing Sheets

U.S. PATENT DOCUMENTS

| | | |
|---|---|---|
| 6,421,439 B1 | 7/2002 | Liffick |
| 6,442,693 B1 | 8/2002 | Sandgren et al. |
| 6,480,885 B1 | 11/2002 | Olivier |
| 6,519,629 B2 | 2/2003 | Harvey et al. |
| 6,525,747 B1 | 2/2003 | Bezos |
| 6,594,693 B1 | 7/2003 | Borwankar |
| 6,630,944 B1 | 10/2003 | Kakuta et al. |
| 6,631,098 B2 | 10/2003 | Chang et al. |
| 6,651,086 B1 | 11/2003 | Manber et al. |
| 6,748,420 B1 | 6/2004 | Quatrano et al. |
| 6,757,517 B2 | 6/2004 | Chang |
| 6,816,906 B1 | 11/2004 | Icken et al. |
| 6,832,245 B1 | 12/2004 | Isaacs et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,058,606 B2 | 6/2006 | Stefik et al. |
| 7,058,897 B2 | 6/2006 | Matsuda |
| 7,069,308 B2 | 6/2006 | Abrams |
| 7,103,634 B1 | 9/2006 | Ullmann et al. |
| 7,107,317 B2 | 9/2006 | Demsky et al. |
| 7,120,681 B2 | 10/2006 | Frelechoux et al. |
| 7,177,929 B2 | 2/2007 | Burbeck et al. |
| 7,209,933 B2 | 4/2007 | Saxena |
| 7,251,689 B2 | 7/2007 | Wesley |
| 7,281,274 B2 * | 10/2007 | Manning et al. ................. 726/31 |
| 7,359,894 B1 | 4/2008 | Liebman et al. |
| 7,383,433 B2 * | 6/2008 | Yeager et al. ................. 713/157 |
| 7,526,458 B2 | 4/2009 | Flinn et al. |
| 7,594,244 B2 | 9/2009 | Scholl et al. |
| 7,607,164 B2 * | 10/2009 | Vasishth et al. ................. 726/1 |
| 7,685,135 B2 | 3/2010 | Brooke et al. |
| 7,716,220 B2 | 5/2010 | Michelitsch et al. |
| 2001/0049624 A1 | 12/2001 | Uyama et al. |
| 2002/0026356 A1 | 2/2002 | Bergh et al. |
| 2002/0032634 A1 | 3/2002 | Abrams et al. |
| 2002/0032905 A1 | 3/2002 | Sherr et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0156875 A1 | 10/2002 | Pabla |
| 2002/0156893 A1 | 10/2002 | Pouyoul et al. |
| 2002/0156917 A1 | 10/2002 | Nye |
| 2002/0169737 A1 | 11/2002 | Armstrong et al. |
| 2002/0178164 A1 | 11/2002 | Wisniewski |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028395 A1 | 2/2003 | Rodgers et al. |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0055898 A1 | 3/2003 | Yeager et al. |
| 2003/0061287 A1 | 3/2003 | Yu et al. |
| 2003/0079120 A1 | 4/2003 | Hearn et al. |
| 2003/0120928 A1 | 6/2003 | Cato et al. |
| 2003/0135576 A1 | 7/2003 | Bodin |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0195851 A1 | 10/2003 | Ong |
| 2003/0195924 A1 | 10/2003 | Franke et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024892 A1 | 2/2004 | Creswell et al. |
| 2004/0039913 A1 | 2/2004 | Kruse |
| 2004/0044727 A1 | 3/2004 | Abdelaziz et al. |
| 2004/0044774 A1 | 3/2004 | Mangalik et al. |
| 2004/0054723 A1 | 3/2004 | Dayal et al. |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0148275 A1 | 7/2004 | Achlioptas |
| 2004/0148434 A1 | 7/2004 | Matsubara et al. |
| 2004/0148503 A1 | 7/2004 | Sidman |
| 2004/0148523 A1 | 7/2004 | Lambert |
| 2004/0162871 A1 | 8/2004 | Pabla et al. |
| 2004/0181487 A1 | 9/2004 | Hanson |
| 2004/0181540 A1 | 9/2004 | Jung et al. |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220957 A1 | 11/2004 | McDonough |
| 2004/0237045 A1 | 11/2004 | Meltzer |
| 2004/0249768 A1 | 12/2004 | Kontio et al. |
| 2004/0260968 A1 * | 12/2004 | Edwards et al. ................. 714/4 |
| 2004/0267625 A1 | 12/2004 | Feng et al. |
| 2005/0015357 A1 | 1/2005 | Shahidi |
| 2005/0021398 A1 | 1/2005 | McCleskey et al. |
| 2005/0021622 A1 | 1/2005 | Cullen |
| 2005/0021750 A1 | 1/2005 | Abrams |
| 2005/0031096 A1 | 2/2005 | Postrel |
| 2005/0044361 A1 | 2/2005 | Chang et al. |
| 2005/0044411 A1 | 2/2005 | Somin et al. |
| 2005/0047573 A1 | 3/2005 | Cameron et al. |
| 2005/0091289 A1 | 4/2005 | Shappell et al. |
| 2005/0091316 A1 | 4/2005 | Ponce et al. |
| 2005/0097170 A1 | 5/2005 | Zhu et al. |
| 2005/0114672 A1 | 5/2005 | Duncan et al. |
| 2005/0114783 A1 | 5/2005 | Szeto |
| 2005/0138139 A1 | 6/2005 | Jain et al. |
| 2005/0138430 A1 | 6/2005 | Landsman |
| 2005/0149621 A1 | 7/2005 | Kirkland et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0188108 A1 | 8/2005 | Carter et al. |
| 2005/0193054 A1 | 9/2005 | Wilson et al. |
| 2005/0195978 A1 * | 9/2005 | Babic et al. ................. 380/231 |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198290 A1 | 9/2005 | Berkey et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0210104 A1 | 9/2005 | Turvinen |
| 2005/0210409 A1 | 9/2005 | Jou |

| | | |
|---|---|---|
| 2005/0215660 A1 | 9/2005 | Tomikawa et al. |
| 2005/0216300 A1 | 9/2005 | Appelman et al. |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0251675 A1 | 11/2005 | Marcjan et al. |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262246 A1 | 11/2005 | Menon et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268329 A1 | 12/2005 | Lee et al. |
| 2005/0283497 A1 | 12/2005 | Nurminen et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0020960 A1 | 1/2006 | Relan et al. |
| 2006/0021009 A1 | 1/2006 | Lunt |
| 2006/0026235 A1 | 2/2006 | Schwartz et al. |
| 2006/0031489 A1 | 2/2006 | Marcjan |
| 2006/0036641 A1 | 2/2006 | Brydon et al. |
| 2006/0036766 A1 | 2/2006 | Baupin et al. |
| 2006/0048059 A1 | 3/2006 | Etkin |
| 2006/0048132 A1 | 3/2006 | Chen et al. |
| 2006/0053209 A1 | 3/2006 | Li |
| 2006/0053380 A1 | 3/2006 | Spataro et al. |
| 2006/0059571 A1 | 3/2006 | Chen et al. |
| 2006/0063552 A1 | 3/2006 | Tillet et al. |
| 2006/0064431 A1 | 3/2006 | Kishore et al. |
| 2006/0085248 A1 | 4/2006 | Arnett et al. |
| 2006/0089913 A1 | 4/2006 | Jaipuria et al. |
| 2006/0090137 A1 | 4/2006 | Cheng et al. |
| 2006/0095471 A1 * | 5/2006 | Krikorian et al. .......... 707/104.1 |
| 2006/0095976 A1 | 5/2006 | Torres et al. |
| 2006/0107286 A1 | 5/2006 | Connor et al. |
| 2006/0117090 A1 | 6/2006 | Schellingerhout et al. |
| 2006/0117378 A1 * | 6/2006 | Tam et al. ......................... 726/3 |
| 2006/0121987 A1 | 6/2006 | Bortnik et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143068 A1 | 6/2006 | Calabria |
| 2006/0143084 A1 | 6/2006 | Donnelli et al. |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0167804 A1 | 7/2006 | Aydar et al. |
| 2006/0167855 A1 | 7/2006 | Ishikawa et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0173985 A1 | 8/2006 | Moore |
| 2006/0184464 A1 | 8/2006 | Tseng et al. |
| 2006/0184617 A1 | 8/2006 | Nicholas et al. |
| 2006/0184997 A1 | 8/2006 | La Rotonda et al. |
| 2006/0190281 A1 | 8/2006 | Kott et al. |
| 2006/0190536 A1 | 8/2006 | Strong et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218153 A1 | 9/2006 | Voon et al. |
| 2006/0218225 A1 | 9/2006 | Hee Voon et al. |
| 2006/0218577 A1 | 9/2006 | Goodman et al. |
| 2006/0230061 A1 | 10/2006 | Sample et al. |
| 2006/0248122 A1 * | 11/2006 | Nikiel et al. .................. 707/200 |
| 2006/0248573 A1 | 11/2006 | Pannu et al. |
| 2006/0259957 A1 * | 11/2006 | Tam et al. ......................... 726/3 |
| 2006/0259982 A1 | 11/2006 | Upendran |
| 2007/0028000 A1 | 2/2007 | Ebbesen et al. |
| 2007/0061487 A1 | 3/2007 | Moore et al. |
| 2007/0106551 A1 * | 5/2007 | McGucken ..................... 705/10 |
| 2007/0143228 A1 | 6/2007 | Jorden et al. |
| 2007/0150603 A1 | 6/2007 | Crull et al. |
| 2007/0173325 A1 | 7/2007 | Shaw et al. |
| 2007/0192294 A1 | 8/2007 | Ramer et al. |
| 2007/0192299 A1 * | 8/2007 | Zuckerberg et al. .............. 707/3 |
| 2007/0220575 A1 * | 9/2007 | Cooper et al. ................ 725/118 |
| 2007/0233828 A1 | 10/2007 | Gilbert |
| 2007/0255785 A1 | 11/2007 | Hayashi et al. |
| 2008/0016081 A1 | 1/2008 | MacMillan et al. |
| 2008/0059992 A1 | 3/2008 | Amidon et al. |
| 2008/0120397 A1 | 5/2008 | Hartman |
| 2009/0010156 A1 * | 1/2009 | Song et al. .................... 370/230 |
| 2009/0030943 A1 | 1/2009 | Kall |

FOREIGN PATENT DOCUMENTS

| | | |
|---|---|---|
| WO | WO 2005/006152 A2 | 1/2005 |
| WO | WO 2005 111760 | 11/2005 |
| WO | WO 2007070676 A2 * | 6/2007 |

OTHER PUBLICATIONS

FOAF (Friend of a Friend) Informational Site www.foaf-project.org.
Architecture of Windows Media Rights Manager www.microsoft.com/windows/windowsmedia/howto/articles/drmarchitecture.aspx (pp. 1-5).
No Author, "pidgin," (website), obtained Jul. 13, 2007, 1 page, http://pidgin.im/.
No Author, "Dijkstra's algorithm," (website), obtained Apr. 10, 2008, 4 pages, http://en.wikipedia.org/wiki/Dijkstra's_algorithm.
No Author, "News—Gaim 1.5.0," (website), obtained Sep. 6, 2007, 3 pages, http://www.gaim.sourceforge.net.
No Author, "Huminity—Social Networking," (website), obtained Feb. 8, 2007, 1 page, http://www.huminity.com/english/software.html.
No Author, "Welcome to Facebook!," (website), obtained Apr. 10, 2008, 1 page, http://www.facebook.com.
No Author, "Friendster—Home," (website), obtained Feb. 8, 2007, 2 pages, http://www.friendster.com/.
No Author, "ICQ.com—community, people search and messaging service," (website), obtained Jan. 16, 2008, 2 pages, http://www.icq.com/.
No Author, "MySpace," (website), obtained Apr. 10, 2008, 2 pages, http://www.myspace.com/.
Beverly Yang et al., "Designing a Super-Peer Network," (article), 2003, 15 pages, ICDE, 19th International Conference on Data Engineering (ICDE'03).
Boon Thau Loo et al., "The Case for a Hybrid P2P Search Infrastructure," (PowerPoint presentation), Feb. 26, 2004, 29 pages, In Procedures of the 3rd International Workshop on Peer-to-Peer Systems (IPTPS), UC Berkeley, San Diego, CA, http://db.cs.berkeley.edu/papers/iptps04-hybridsearch.pdf.

* cited by examiner

SYSTEM AND METHOD FOR CONTROLLED VIRAL DISTRIBUTION OF DIGITAL CONTENT IN A SOCIAL NETWORK

FIELD OF THE INVENTION

The present invention generally relates to controlled sharing of digital content over a network, and is more particularly concerned with a computer software application and corresponding method of providing limited and controlled distribution of digital content in a dynamic, unstructured social network.

BACKGROUND OF THE INVENTION

Modern technology has provided consumers with a wide variety of electronic devices with which to capture digital content, such as but not limited to content captured in video, audio, photo, text or other format. This phenomenon coupled with advances in networked communication, such as communication via the Internet, has resulted in greater content sharing among individuals. Several existing computer-based applications or related systems provide features for assisting a content producer with the distribution of digital content.

There are systems in place today that can distribute content to a known set of users. Also, some peer-to-peer (P2P) systems exist that can distribute content to anyone and everyone. However, such known systems do not account for potential scenarios where a content producer desires a limited, controlled distribution to a dynamic, unstructured social network. For example, a teenager creates a home video for fun. He wants some of his friends to see it, but not the entire world. Another scenario may involve a movie producer who wants to distribute a movie preview to a select number of reviewers and their associates, but not to everyone. Yet another example is where a family takes some video of a child's birthday party. The family would like for extended family and close friends to see it, but not have it available to the general public.

The scenarios mentioned above involve situations where a "limited viral distribution" is desired. The content producer does not want to identify exactly who is extended family or what constitutes "close friend". Ideally, the content producer wants the content to spread virally to some "degree of separation". "Degree of separation" used here refers to how far away (levels) one user is away from the originating user in a "friend of a friend" (FOAF) or other type of social network. In these examples the user wants to seed the content to a select group of people and allow them to have the freedom to spread the content further—at their discretion, and to users of their choice. However, the viral spread needs to be controlled, so as not to permit the content going to the general public. Additionally, the content producer may want to provide a different quality or portion of the content for users as they are farther "out" on the social network.

Despite the availability of various computer-based applications for distributing digital content in a network environment, a need exists for a method and related article of manufacture that provides a content producer with an ability to virally distribute digital content to their social network while providing controls on distribution and access.

SUMMARY OF THE INVENTION

Objects and advantages of the invention will be set forth in part in the following description, or may be obvious from the description, or may be learned through practice of the invention.

In general, the present invention is directed to a system and method for providing controlled distribution of digital content through a predetermined number of levels in a social network. A controlled content distribution system (CCDS) includes a desktop application and corresponding program instructions that may be provided on users' peer systems. The CCDS application includes features and steps for ensuring that a given content producer can share digital content with other contacts in a social network (hereinafter referred to as "content recipients") while maintaining control over the access and limited distribution of the shared content.

Content distribution rules may be configured by a content producer for one or more authorized levels of distribution in a network. A content producer can specify distribution parameters including a level limit representative of the maximum number of levels, or degrees of separation, a potential content recipient may be from the content producer. Additional content distribution rules/parameters are definable by the content producer for one or more allowable levels of access, and typically include alteration definitions that may specify degradations, augmentations, or partial deletion of the digital content as it propagates through selected designated levels in the social network. A content producer specifies an initial distribution list and the above distribution parameters, and this information is sufficient to control the distribution of specified digital content without prior knowledge of participants and their relationships. As such, limited and controlled distribution of digital content to a dynamic and unstructured social network is afforded.

One exemplary embodiment of the presently disclosed content distribution technology corresponds to a method for distributing digital content among one or more levels within a dynamically created social network. A first step in accordance with such method corresponds to obtaining access to digital content provided by a content producer. A second step involves identifying one or more distribution parameters that establish limitations on how the digital content is to be distributed to one or more content recipients. Distribution parameters may be provided as selected input by the content producer. The distribution parameters may include a level number (n) representative of the maximum number of separation levels allowed between the content producer and any content recipient. An initial distribution list may also be provided. Distribution parameters also include one or more alteration definitions for selected levels of the n allowable levels in the social network. Alteration definitions may define degradation characteristics for the digital content, such as a number of frames per second, file resolution, file size, length, color or bit rate, or other file characterization parameters as will be known or appreciated by one of ordinary skill in the art. Alteration definitions may also define an augmentation file, such as but not limited to a visible or invisible watermark or other hindrance, an advertisement, a portion of text, or a supplemental audio or video segment for appending, prepending or otherwise incorporating into the digital content. Another parameter may correspond to a maximum number of total content recipients for overall distribution or for maximum distribution per level. A still further distribution parameter may include one or more relationship types for identifying desirable characteristics or limitations associated with content recipients authorized to receive versions of the digital content.

In further accordance with the above exemplary method, a distribution package may also be created for relay across a network to an FOAF License Server (FLS) and also to one or more content recipients. Such step of creating a distribution package is performed each time the digital content is passed from one allowable level to the next in the social network. Creating a distribution package may involve in part the generation of a configuration data file, which may be prepared in a rights expression language (REL) such as XML or the like. The configuration data file identifies the distribution parameters per level selected by the content producer. A key ID for uniquely identifying the distribution package and digital content therein may also be generated. This key ID, along with a license key seed, the configuration data file, and an encrypted version of the digital content are all included in a distribution package.

Still further steps may involve inviting one or more content recipients as designated in an initial distribution list to view the digital content, verifying authenticity of each content recipient who subsequently requests access to the digital content, and initiating playback of an altered form of the digital content as defined by the alteration definition for the given level.

Features and steps for saving configuration profiles with selected distribution parameters may also be provided, as well as an audit trail mechanism for tracking the viewing and distribution of the digital content as it propagates through a network. Signal notification of such viewing and/or distribution may be sent back to the content producer.

Another related aspect of the subject controlled content distribution system (CCDS) application and corresponding methodology concerns an article of manufacture such as a computer program comprising a program storage medium readable by a computing device having a memory, the medium tangibly embodying one or more programs of instructions executable by the computing device to perform method steps of importing digital content for controlled distribution, receiving input in the form of distribution parameters identified by a content producer for establishing limitations on how the digital content is to be distributed, and creating a distribution package for subsequent relay across a network.

Additional instructions related to the above article of manufacture may be configured to direct a computing device to send notification to the content producer to prepare a configuration data file, generate a unique key ID, encrypt the digital content, send notifications of user viewing or distribution, and/or interface with a media playback device.

Other features and aspects of the present invention are discussed in greater detail below.

BRIEF DESCRIPTION OF THE SEVERAL VIEWS OF THE DRAWINGS

The foregoing and other features, aspects and advantages of the present invention will become better understood with regard to the following description, appended claims and accompanying drawings where:

DETAILED DESCRIPTION OF THE PREFERRED EMBODIMENTS

Figure 1:
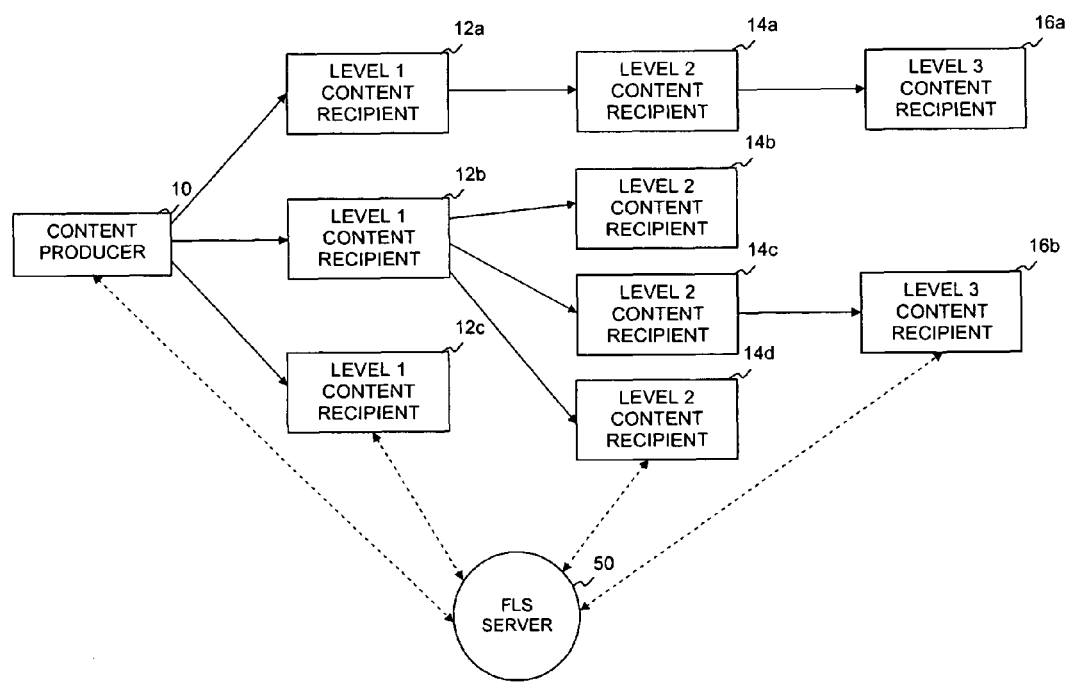
FIG. 1 provides a block diagram representation of an exemplary network interaction among multiple peer clients and a license server in a social network, specifically depicting an example of controlled distribution among three levels.

The invention will now be described in detail with reference to particular embodiments thereof. The embodiments are provided by way of explanation of the invention, and are not meant as a limitation of the invention. It will be apparent to those skilled in the art that various modifications and variations can be made in the present invention without departing from the scope and spirit of the invention. For example, features described or illustrated as part of one embodiment may be used with another embodiment to yield a still further embodiment. Thus, it is intended that the present invention include these and other modifications and variations as come within the scope and spirit of the invention, including the appended claims and their equivalents.

Social networks, such as friend-of-a-friend networks, are often utilized to share information among a group of networked contacts. Shared information may correspond to many different forms of electronic content, including but not limited to digital videos, digital images, digital photos, digital audio, text, graphics, html code or other file types. The present specification is directed to the sharing of digital content with particular exemplary reference to content in video or graphic file format, although it should be appreciated by one of ordinary skill in the art that the disclosed content distribution technology can be applied to other types of electronic content provided in digital or other suitable form. It should also be appreciated that more than one piece of digital content may be selected for distribution, and multiple pieces of content may correspond to different file types.

Aspects of the present invention provide features and steps for ensuring that a given content producer can share digital content with other contacts in a social network (hereinafter referred to as "content recipients") while maintaining control over the access and limited distribution of the shared content. A content producer can specify distribution parameters including a level limit representative of the maximum number of levels, or degrees of separation, a potential content recipient may be from the content producer. Additional content distribution rules/parameters are definable by the content producer for one or more of the allowable levels of access, and typically include alteration definitions that may specify degradations, augmentations, or partial deletion of the digital content as it propagates through designated levels in the social network. A content producer specifies an initial distribution list and the above distribution parameters, and this information is sufficient to control the distribution of specified digital content without prior knowledge of participants and their relationships. As such, limited and controlled distribution of digital content to a dynamic and unstructured social network is afforded.

Aspects of the subject content distribution technology are discussed herein in the context of a peer-to-peer network. It should be appreciated that this description is for exemplary purposes only and additional networked communications, such as those employing client-server, central server or other network environments may also employ the features and steps disclosed in accordance with aspects of the present invention.

Additional aspects of the presently disclosed technology make reference to servers, processing units, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file from a second computer, the access may involve one or more intermediary computers, proxies, and the like. The actual file may move between the computers, or one computer may provide a pointer or metafile that the second computer uses to access the actual data from a computer other than the first computer, for instance.

A basic example illustrating some general principles afforded by the presently disclosed technology will now be discussed with reference to FIG. 1. A content producer 10 identifies digital content that is to be shared with others in a network. Such digital content identified by the content producer may have been originally created by the content producer. For example, the content producer may have taken a video or picture to be shared with others. However, it is not essential that the content producer is the original source of the digital content. In some embodiments, the content producer may have obtained the digital content from another source and is simply selecting the digital content for further dissemination. It should be appreciated that users of the disclosed technology, including content producer 10 as well as content recipients may correspond to individuals, groups of individuals, business entities, etc. and should not be a limiting feature of the present subject matter.

Before a content producer actually distributes digital content, certain distribution parameters that establish limitations on how the digital content is to be distributed to one or more content recipients must be selected. Distribution parameters can include such information as a level limit representative of the maximum number of "degrees of separation" allowed between the content producer and any content recipient. In the example of FIG. 1, content producer 10 designates a level limit of three levels, which means that the selected digital content can only be distributed up to a maximum of three levels away from the content producer 10. Distribution parameters can also include an initial distribution list that designates the starting nodes for the dynamically created social network. In the example of FIG. 1, content producer 10 selects three users in an initial distribution list, corresponding to level one (1) content recipients 12a, 12b and 12c (herein collectively referred to as recipients 12). Level one recipients 12 and others are free to distribute to any entity they wish. For example, in accordance with a second level of content distribution as illustrated in FIG. 1, level one recipient 12a may choose to send the selected digital content to level two (2) recipient 14a. Recipient 12b may choose to send the digital content to three recipients 14b, 14c and 14d, and recipient 12c does not forward the digital content. In accordance with a third level of content distribution, recipient 14a decides to forward the digital content to level three (3) recipient 16a, and recipient 14c sends the digital content to recipient 16b. Level three recipients 16a and 16b are restricted from further distributing the selected digital content since content producer 10 selected a distribution level limit of three. As observed from the layered communication among networked users depicted in FIG. 1, the entire spectrum of distribution is not defined by the content producer. Instead, the subject content distribution network involves dynamic (or viral) distribution as opposed to a predetermined configuration. Content producer 10 doesn't know if the selected digital content will reach three or three-hundred people, but it will not be distributed beyond three levels deep in the dynamically created social network.

Additional distribution parameters that are specified by content producer 10 include alteration definitions for one or more of the three allowable levels in the social network. Alteration definitions allow the selected content to be degraded or augmented in some fashion as it is passed from friend to friend. The content is degraded or otherwise altered by a peer application provided at each designated user's location prior to distributing the file. In other words, the controlled content distribution system employs a "just in time" or "lazy" alteration. In one example, content producer 10 may select a digital video for controlled distribution to content recipients and may wish to degrade the quality level of the video as it spreads farther away from the content producer. In one example, first level recipients 12a, 12b and 12c receive a highest quality video from content producer 10. Second level recipients 14a-14d respectively receive a medium quality version of video, and third level recipients 16a and 16b receive a version that is low quality and has advertisements preceding the video playback. More specific aspects of potential alteration definitions will be provided later in further detail.

The subject controlled content distribution system (CCDS) consists in part of a desktop application that is required by every peer-level participant in the social network. FIG. 2 illustrates exemplary physical components that may be present in each of the peer-level participant systems illustrated in FIG. 1, including a system associated with the content producer and each content recipient. In one embodiment, peer system 20 includes a processor unit 22, which may be any type of processor as included or associated with a personal computer (PC), mobile terminal device (e.g., cellular telephone), Personal Digital Assistant, or the like. The processor unit 22 of exemplary peer system 20 may be configured to process data transmitted to or received from other users. A communications interface 24 may also be provided to buffer or otherwise handle the actual relay of such communicated data as it is sent or received over a network 26. Network 26 may correspond to a dial-in network, a local area network (LAN), wide area network (WAN), public switched telephone network (PSTN), the Internet, intranet or ethernet type networks and others over any combination of hard-wired or wireless communication links. Optional input peripherals, such as input peripheral 28 may be coupled to peer system 20 so that a user can provide input such as user identification, registration and/or authentication information, content selection, and definitions for distribution parameters in accordance with the subject controlled content distribution technology. Examples of possible input peripheral devices include a keyboard, touch-screen monitor, mouse, scanner, microphone, etc. Although not illustrated in FIG. 2, additional peripheral devices including but not limited to user displays, printers, etc. may also be provided in conjunction with peer system 20.

Referring still to the peer system of FIG. 2, memory 30 is also provided for storing a variety of digital information, including data and software or firmware. Memory 30 may be provided as a variety of computer-readable medium, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.). As will be further discussed in the present specification, memory 30 may be a designated storage location for digital content 32 that is selected for distribution and also for storing the program instructions and executable code corresponding to the controlled content distribution system (CCDS) desktop application 34. Program instructions and executable code that are stored in memory 30 are typically read and executed by the processor unit 22 in the corresponding peer system.

The CCDS application 34 is required by every participant in the social network. In one embodiment, no formal registration process is required. A user participating in the system only needs to download and install the application 34 and associate a communication identifier such as e-mail and/or IM address. The application 34 is responsible for content packaging and content alteration, as will be described later in further detail. Application 34 may utilize the user's primary e-mail and/or instant messaging and/or short message service (SMS) systems or the like (not illustrated in FIG. 2 but also provided in peer system 20) for the actual content distribution. Application 34 may also be designed to integrate with, or to utilize, existing media playback applications, such as but not limited to Windows Media Player, QuickTime, iTunes, etc. for content playback and other features.

As previously mentioned, when digital content is selected for controlled distribution in a network, a plurality of distribution parameters must be identified for establishing limits on how the digital content is to be distributed. In one embodiment, a content producer provides input to define the distribution parameters. One exemplary distribution parameter includes a level limit (n) representative of the maximum number of "degrees of separation" allowed between the content producer and any content recipient.

Additional distribution parameters include an alteration definition for one or more of the allowable levels (n levels total) selected by the content producer. As an example, if the level limit is three (3), then the content producer defines an alteration definition for one or more of the three (3) allowable levels. Digital content is distributed in accordance with the subject technology in a form that is altered from the original digital content. Alterations may include various levels of content degradation, augmentation, or other modifications. When an alteration definition is chosen to define a certain degradation level for the digital content, it should be appreciated that such degradation can be identified in terms of a given number of frames per second (fps), file resolution, file size, length, bit rate or other compression characteristic. In one embodiment, selected compression characteristics to digital content are defined in terms of percentages. For example, an original digital video may be provided to a first level distribution list of identified recipients with a quality level of 25% relative to the original quality of the digital video. In another embodiment, compression characteristics are defined as a specific quality level. For example, an altered digital video may be characterized as one with a quality level of 30 frames per second or a file size of 5.0 Megabytes.

Additional modifications may correspond to deleting a portion of video or audio, cropping a photo or other image or graphic file, or changing the color characteristics of a photo, image or graphic file from color to black and white or vice versa. Alterations may also include augmentations, such as but not limited to the addition of visible or invisible watermarks or other visual or invisible hindrances to a file, the addition of video or image advertisements to the original content, the addition of text comments to a photo, or the addition of annotations to a video. An advertisement may be placed before, during or after the original content for levels farther out in the network. Alternatively, portions of the digital content may be deleted. Still further, a user may make "additional scenes" available for users closer in the network, while those scenes are removed for user farther out in the network. Yet another form of augmentation may involve selective or random reordering of the content in a text, graphic, video file or the like. It should be appreciated that the types of modifications available often vary depending on the type of digital content selected for distribution.

The CCDS application provides features for a user to define additional distribution parameters or rules that can be stored with the above alteration definitions to further customize the distribution of content. In one example, a content producer may wish to further limit the spread of content by placing a maximum number of invitations per user and/or per level. In another example, the CCDS provides users with an ability to apply an expiration timestamp on the content distribution. If the timestamp passes, users are not able to view or share the distributed content. Some further examples of additional distribution parameters may include the following: (1) a maximum number of users to distribute content (total or per level); (2) a pre-defined possible user list, blocked user list, acceptable domains, etc. (for example, a content producer may define that the content can only be distributed to users with addresses at "flashpoint.com" or other specified domain name or group of domain names, or users with a given IP address, range of IP addresses, or other identification parameter(s)); (3) a timeframe for distribution (total or per level); and (4) users associated with a specific group, FOAF network, or other social network, or that have specific interests. In accordance with a distribution parameter such as (3) above, the content producer may have the ability at each level to configure the start and end time for distribution. This would allow a slow rollout by, for example, distributing one level per week. Similarly, simple distribution duration can be assigned. In accordance with a distribution parameter such as (4) above, the controlled content distribution system can be integrated with an existing service, such as but not limited to MySpace, Friendster, or others, and permit or allow the invitation for accessing digital content based on the user ID matching given or selected parameters.

After digital content is selected by a content producer for subsequent controlled distribution and the necessary distribution parameters are defined, the CCDS application creates a distribution package. Each time content distribution is initiated on a different allowed level in the social network, the application creates a new distribution package. Prior to distributing the content, the application creates the version of the content that is defined by the next allowed level. It should be appreciated that the first distribution of the digital content should preserve the original content format in a lossless fashion such that each subsequent level in the distribution network has the necessary quality level associated with its given alteration definition. Once a new distribution package is ready, the peer system integrates with a content distribution mechanism for actual distribution of the altered content. An example of one suitable content distribution mechanism corresponds to one using a BitTorrent protocol, such as created and maintained by BitTorrent, Inc. The distribution package is sent to each user identified by a content producer or authorized content recipient in an initial distribution list. Such initial distribution list may be selected by a user when the CCDS application presents a list of possible user contacts from the user's primary e-mail, instant message (IM), short message service (SMS) or other messaging application.

Figure 3:
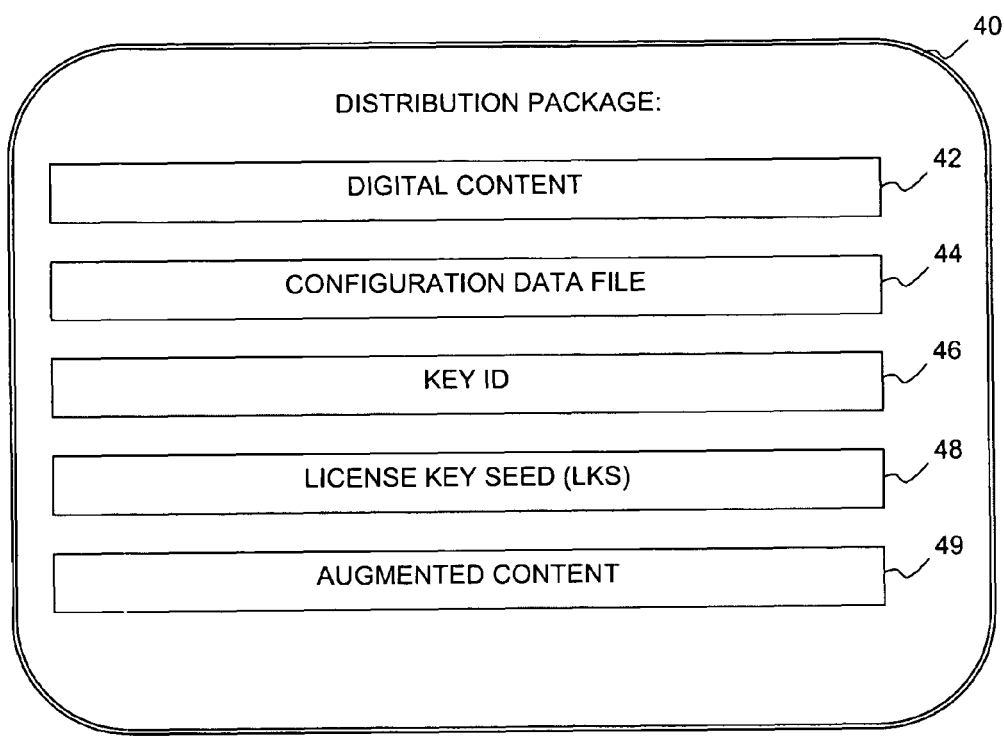
FIG. 3 depicts exemplary portions of a distribution package as created and distributed in accordance with a controlled content distribution system of the present invention.

With more particular reference to an exemplary distribution package, FIG. 3 provides a block diagram of exemplary file portions provided therein. It should be appreciated that distribution packages 40 are typically created as a binary or other digital file with a combination of various information and/or instructions. A first portion included in the exemplary distribution package 40 of FIG. 3 is the digital content 42 selected by a content producer. A second portion corresponds to a configuration data file 44, which is created based on the content producer's settings for the content and placed alongside the content as part of the content distribution package. In one embodiment, the configuration data file is expressed in a rights expression language (REL) which is created by the application provided at the content producer's peer system. In one particular exemplary embodiment, configuration data file 44 is provided in Extensible Markup Language (XML) format, although other code languages may be utilized. A structured format is used to describe the defined alterations (including degradations, augmentations, deletions, or other modifications), and the XML structure will vary based on the type of media file selected in the digital content. An example of an XML file which defines the alterations mentioned in the previous example discussed with reference to FIG. 1 is now presented.

```
<comment>
    Level 1: Original
    Level 2: Medium Quality
    Level 3: Low Quality and Advertisement Pre-pended
</comment>
<current-level>0</current-level>
<distribution-list>
    <user name="Sue" contact="sue@yahoo.com" />
    <user name="John" contact="john@msn.com" />
    <user name="Mike" contact=mike@hotmail.com" />
</distribution-list>
<media type="video">
    <level id="1">
    </level>
    <level id="2">
        <fps reduce="25%" />
        <size reduce="25%"/>
    </level>
    <level id="3">
        <fps reduce="25%" />
        <size reduce="25%"/>
        <append location="0">
        <media type="video", name="car ad",
        url=http://mycarads.com/ad 1.mpg>
        </append>
</media>
```

Referring still to FIG. 3, distribution package 40 may also include a key ID 46, which corresponds to a unique identifier for the selected digital content 40 that is created by the content producer's peer application. A license key seed (LKS) 48 is also included in distribution package 40. LKS 48 is a value that is only known by the content producer and a license server, and is used to encrypt the distribution package. The distribution package ultimately contains a form of the digital content that has been encrypted and locked with a digital "key". The result is an encrypted file that can only be unlocked by a person who has obtained a license with the required key for decrypting the digital content. Such a license may be received from a license server, as will be discussed later in further detail.

Distribution package 40 may also include content 49 that is to be used for augmentation to a form of the digital content. For example, some alteration definitions may include an advertisement for displaying before, during or after a given form of digital video. As set forth in the above exemplary XML file, level three recipients are shown a car ad such as one located at the web address or URL of http://mycarads.com/ad 1.mpg. If placing an advertisement or other augmented file for level three users, the advertisement can be extracted from the Internet during the creation step of a level two user sending to a level three user. By utilizing references and loading the content only when needed, original file size of the distribution package can be reduced. Although the above extraction process may be used in one embodiment, it should be understood that the advertisement could alternatively be included as additional content from the outset of the content distribution and inserted for viewing only when distribution reaches third level recipients.

Figure 2:
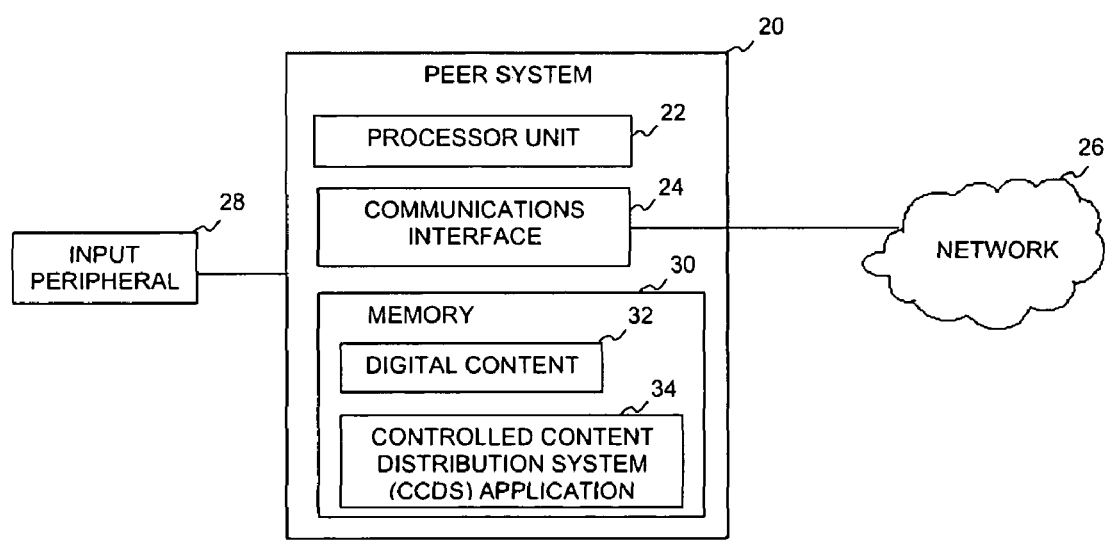
FIG. 2 provides a block diagram representation of exemplary hardware and software components as well as coupled peripheral devices for a peer system in accordance with one embodiment of the present invention.
Figure 4:
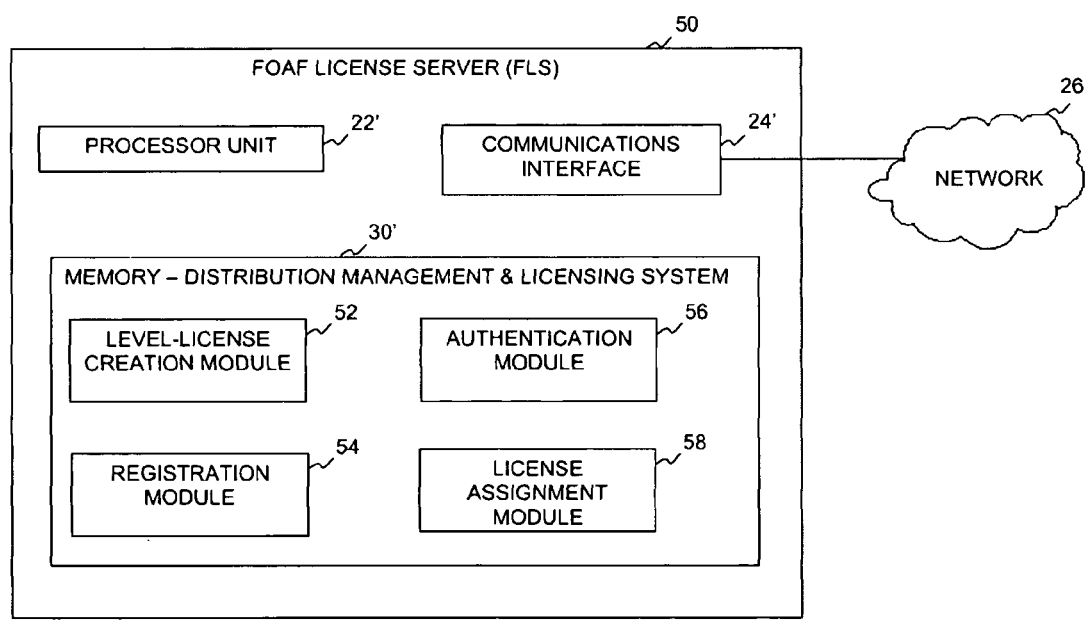
FIG. 4 provides a block diagram representation of exemplary aspects of a server system in accordance with one embodiment of the present invention, including modular components of a distribution management system.

Certain aspects relating to the control of content distribution in accordance with the disclosed technology are afforded via an FOAF license server (FLS) 50, such as represented in FIGS. 1 and 4. FLS 50 may be a stand-alone centrally hosted license server or a distributed license server that is accessible from the peer systems of a content producer and content recipients (as represented by the network configuration of FIG. 1). It should be appreciated that although FLS 50 is only depicted in FIG. 1 as being in bi-directional communication via dashed lines with content recipients 12c, 14d and 16b, such communication is actually provided for each recipient in the social network. The limited depiction is merely provided for ease of illustration.

Referring now to FIG. 4, FLS 50 may generally function as a distribution and licensing management system. FLS 50 may include a select combination of the exemplary hardware components already discussed in relation to a peer system 20 as illustrated in FIG. 2. In one embodiment, at least a processor unit 22', a communications interface 24' and memory 30' are provided. Memory 30' is used to store program instructions and executable code that is read and executed by processor unit 22'. Such components function together to provide a plurality of operative modules, including a license-level creation module 52, a registration module 54, an authentication module 56 and a license assignment module 58. Although not specifically illustrated in FIG. 4, memory 30' associated with FLS 50 may also include a database for storing information identifying the relationship between a given piece of content and the corresponding levels, level-licenses and users to whom the content is distributed. It should be appreciated that a particular piece of content typically has several different level-licenses and a user can have more than one level-license assigned to him which belongs to a different piece of content.

License-level creation module 52 is used after a content producer selects digital content and defines parameters for its distribution. The resulting digital package (such as previously discussed with reference to FIG. 3) is sent to FLS 50, where a level-license is created for each of the allowed levels defined by the content producer. In the previous example discussed with reference to FIG. 1, FLS 50 would produce three level-licenses, one for each of the three levels defined by content producer 10. Each level-license captures the rights at that level as expressed in the REL of the configuration data file associated with the digital content.

Registration module 54 may optionally be used to register each user in a social network, including content producers and recipients. In one embodiment, registration module 54 may be used to coordinate a formal registration process in which a user provides certain identifying information including name, contact information, program purchase specifics, serial number, etc. In another embodiment, registration module 54 is used simply to ensure that the required CCDS application has been downloaded to the user's peer system.

Authentication module 56 is used to verify the identity of a content recipient. When a content recipient receives an invitation to view digital content, that content recipient must be authenticated with the FLS 50 before being able to decrypt the digital content for viewing or further distribution. FLS 50 typically compares the identity of the content recipient seeking authentication with the distribution list created by a sending user at the previous level in the network. If the content recipient is successfully matched to a member of the distribution list, then authentication will be successful. Otherwise, the content recipient may not be able to access the distributed digital content.

License assignment module 58 corresponds to a portion of FLS 50 that creates licenses for received content in response to an access request from a content recipient. Licenses are created according to the level-rights and distribution parameters defined for the particular level of the content recipient. A license generated by FLS 50 includes a key that can be used to unlock, or decrypt the content that was previously encrypted by a user's content distribution application.

License assignment module 58 may also coordinate the revocation, denial and explicit assignment of level-rights. For example, a content producer can revoke all license-level rights originally issued. This procedure would be handled by the license assignment module 58. Similarly, a content producer can revoke rights for a particular license-level (e.g., all level three content recipients) while leaving all other license-levels intact. In accordance with denying user rights, a content producer may also specify a user or group of users that may never receive a license for any or all content independent of how through the social network that content was received. In accordance with explicit rights assignment, a content producer may specify that a particular user, no matter where in the social network, can receive a specific level-right.

Figure 5:
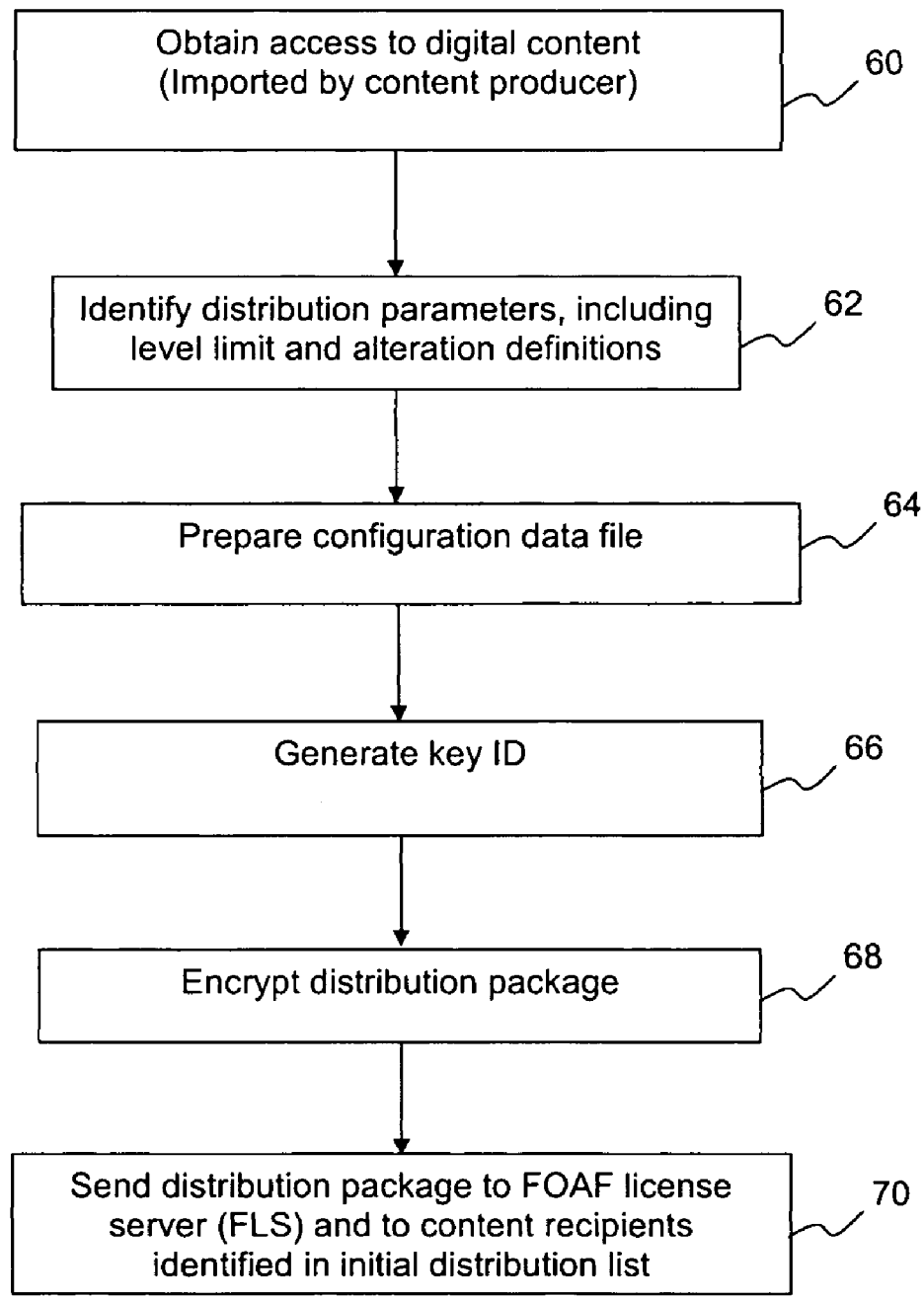
FIG. 5 is a flow diagram representation of exemplary steps for distributing digital content as may occur in a CCDS application provided at a content producer's peer system.

Referring now to FIG. 5, exemplary steps for distributing digital content in a controlled fashion as may occur within the peer system and corresponding CCDS application of a content producer are illustrated. A first step 60 involves obtaining access to digital content. Digital content may correspond to one or more types of similar or different electronic media and is typically imported by the content producer into the CCDS application. Distribution parameters are then identified in step 62, and may include information such as a level limit, an alteration definition for one or more allowable levels, an initial distribution list, and other parameters as previously discussed.

In one example of the method in FIG. 5, a content producer may select a digital video to share to a maximum of four levels in a social network. Distribution parameters are then defined in terms of level-rights for each of the four allowable levels. In one example, level-rights may be configured as follows: (1) Level One—full size access at 30 frames per second (fps); (2) Level Two—half size access at 15 fps; (3) Level Three—half size access at 15 fps and access to only the first 30 seconds of the video; and (4) Level Four—a thumbnail access of the first frame only. Levels Five and beyond are granted no access to the digital video.

Referring still to FIG. 5, the CCDS application generates a configuration data file in step 64. The configuration data file may be prepared in a rights expression language (REL), such as XML or the like. The CCDS application then generates a unique key ID in step 66 for the content identified in step 60. A license key seed (LKS) is then used in step 68 to encrypt the distribution package, including the digital content, configuration data file setting forth all distribution parameters, key ID, and LKS. The distribution package is then sent in step 70 to a FOAF license server (FLS) and to content recipients identified in the initial distribution list. The distribution package cannot be "unlocked" or decrypted by any content recipient unless a key is received, which is typically provided when a license is assigned to the recipient by the FLS.

Figure 6:
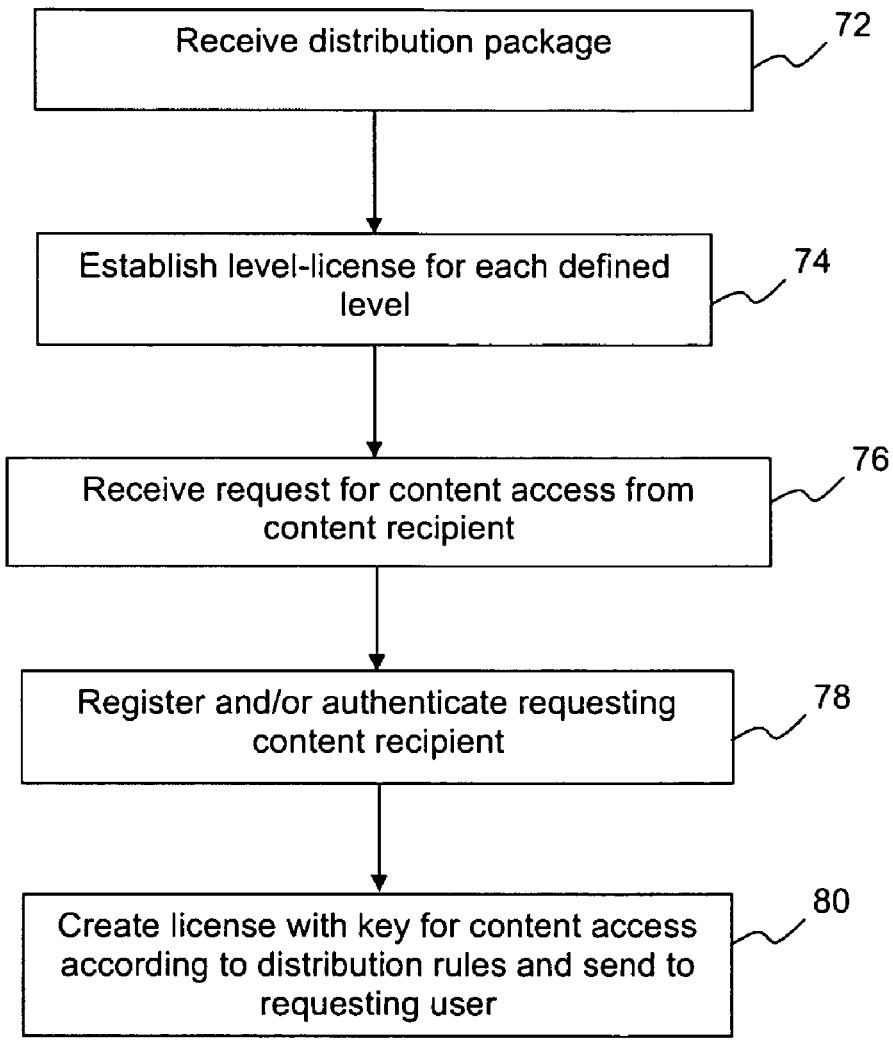
FIG. 6 is a flow diagram representation of exemplary steps for managing the distribution of digital content as may occur in a license server.

FIG. 6 illustrates exemplary process steps that may occur at an FLS after it receives a distribution package created by a content recipient. The initial step of receiving the distribution package is indicated as step 72. In a subsequent step 74, the FLS creates level-licenses for each allowable level as defined by the content producer. For example, if a content producer selects a level limit of four as described above, the FLS will create four level-licenses that capture the type of file quality or related characteristics associated with any alteration definitions provided for each level. As content is shared across a social network, users are automatically granted level-licenses depending on where they are in the network. It is important to note that users have different level-licenses for different pieces of content depending on how the content arrived over the network. For example, it is possible that user A has level one rights on content b shared to him by user B, but the same user A has level four rights on content c shared to him by user C.

With further reference to FIG. 6, the FLS may receive in step 76 an access request from a content recipient. The FLS may then register and/or authenticate the content recipient in step 78 to ensure that the content recipient matches with the initial distribution list generated by the content producer. If this authentication step is successful, the FLS then creates a license in step 80 for content access according to the defined alteration definition for that content recipient. The FLS then sends this license to the content recipient. As previously mentioned, the license should include a key that allows the content recipient to decrypt and open the received digital content.

Figure 7:
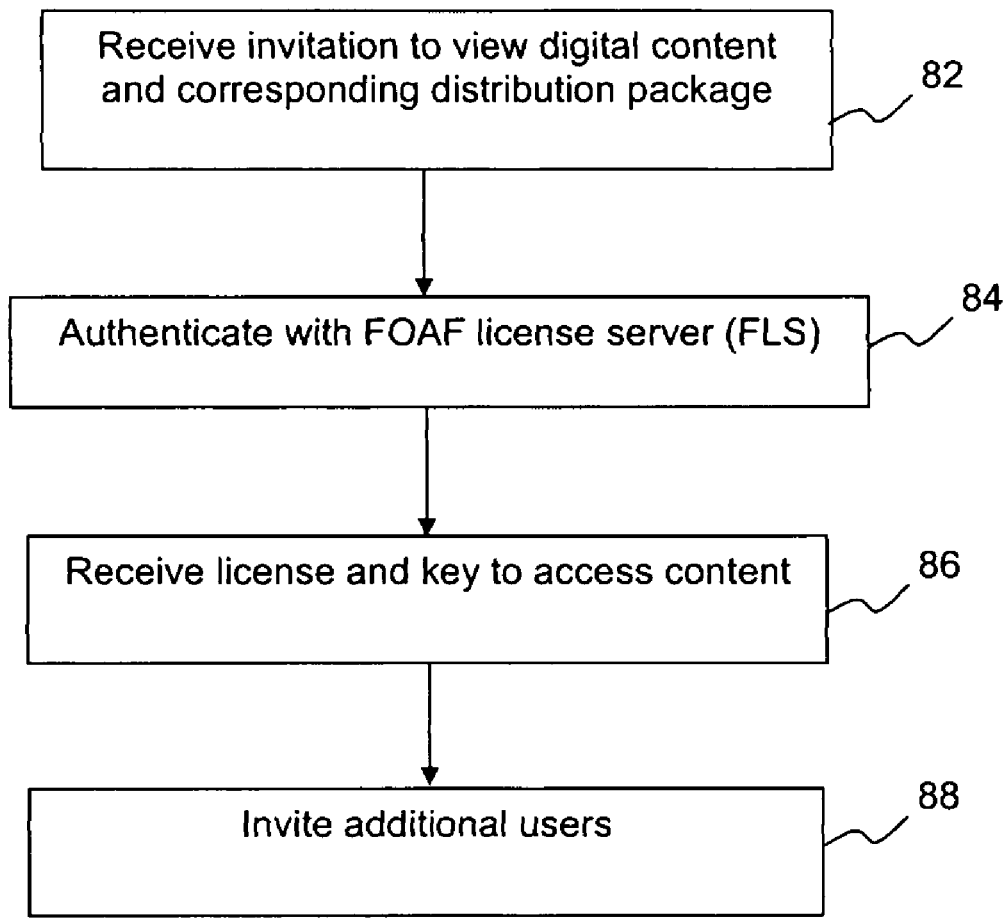
FIG. 7 is a flow diagram representation of exemplary steps for distributing digital content as may occur in a CCDS application provided at a content recipient's peer system.

Referring now to FIG. 7, exemplary steps for receiving and further distributing digital content in a controlled fashion as may occur within the peer system and corresponding CCDS application of a content recipient are illustrated. In accordance with a first exemplary step 82, a content recipient receives an invitation to view digital content. Users may be notified of such invitation via their e-mail, instant messaging, short message service or other messaging application. The invitation typically is sent in conjunction with the actual encrypted distribution package. When the user attempts to open the file, their CCDS application will be launched. The content recipient then authenticates (or registers and authenticates) himself with the FLS in step 84. Authentication consists of verifying that the current user was one of the designated content recipients that are identified in the configuration data file within the distribution package. The verification may be checked against the e-mail, instant messaging, SMS, or other addresses that were assigned to the current user's instance of the CCDS application. After verifying the user, the CCDS application on the user's peer system passes the content playback function to the user's designated media player. The CCDS application may be integrated with the media player or may be separate whereby the CCDS application streams the digital content to the media player. Such playback functions are known to those of ordinary skill in the art, and so more detailed discussion of such functions are not provided herein. If authentication is successful, content recipient then receives in step 86 a license to access the digital content, and using a key provided within the license is able to decrypt the digital content for viewing. In some embodiments, if desired by the content recipient and if allowed by the content producer, the content recipient will invite additional users in step 88.

To further illustrate the above exemplary steps, assume that a content producer decides to share selected digital content with a certain number of people corresponding to m users. Using a CCDS application, the content producer sends invitations to those users. The CCDS application informs the FLS that the content producer has invited these m users. The FLS then grants level one rights to those m users since the content producer has invited them. A level one user receives the invitation via a dedicated CCDS application, acquires an encrypted copy of the digital content and undergoes authentication with the FLS. The FLS creates a license for that content using the level one rights, and sends the license and required key to the requestor. The CCDS application provided at the level one recipient's peer system receives the license, which then allows level one access to the user for that particular piece of content. The level one user in turn decides to send an invitation to view that content to another set of users, p. The CCDS application at the level one user's peer system informs the FLS that the level one user has invited these p users. The FLS then grants level two rights to those p users (as long as this additional level of distribution is allowed according to initial distribution parameters defined by the content producer). When and if the level of invitations reaches the point where the content originator has no assigned rights, the FLS informs the invitee that no rights are available. The FLS may also block users from accessing digital content if that user is selectively blocked by a content producer or otherwise lacks authorization to access one or more given portions of digital content.

A CCDS application in accordance with the present technology may optionally provide users with an audit trail feature that tracks usage and distribution of the digital content. Since an object of the CCDS application is to control viral content distribution, tracking the actual usage of the content is a significant capability. An audit trail feature initiates a step of sending notification back to an original content producer any time another user attempts to open, view or further share the distributed files. A mechanism for sending data back over a network to the content producer depends on the configuration of the overall system network. For example, if the CCDS is implemented as a peer-to-peer (P2P) system, the data is sent back to the user either via e-mail or via a web service on the peer system of the content producer. If the CCDS is implemented with a central server, the data is collected via a web service on the central server. The content producer is able to view details and summaries of the viewing and distribution activities through a user interface either on the peer system desktop or from the central server.

Another additional capability of the subject CCDS and related system application is a profiling mechanism which allows a user to save a distribution configuration as a profile for future distributions. For example, a parent who wants to share video footage of her child's latest sports game can save a "Home Video Profile" that specifies a level limit of three (3) levels deep, whereby level one recipients are configured to receive an original version of the video, level two recipients are configured to receive a medium quality version of the digital video, and level three recipients are configured to receive a low quality version of the video. Another example may correspond to a movie producer who wants to distribute a preview of his newest work. The movie producer saves a profile with a level limit of four (4), the level one recipients are designated to receive an original version of the content, while recipients at levels two, three and four are only able to receive a medium quality version with an advertisement inserted at the beginning of the original content.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention.

What is claimed is:

1. A method for distributing digital content among one or more levels within a dynamically created social network, comprising the following steps:
    receiving, by a first computer, a reference identifying digital content;
    receiving, by the first computer, one or more distribution parameters that establish limitations on how the digital content is to be distributed to one or more content recipients based on a level that corresponds to the one or more content recipients, wherein the one or more distribution parameters include a maximum level number identifying a maximum level allowed between a content producer and a respective content recipient, wherein each content recipient of the digital content has a corresponding level of a plurality of levels determined based on a number of content recipients of the digital content in a distribution path of the digital content from the content producer to the respective content recipient, and also at least one alteration definition associated with at least one of the plurality of levels that defines a required alteration of the digital content prior to permitting a content recipient associated with the at least one of the plurality of levels to perceive the digital content;
    creating, by the first computer, a distribution package comprising the digital content, the maximum level number, and the at least one alteration definition; and
    sending, by the first computer, the distribution package to at least one second computer.

2. The method of claim 1, wherein said creating step is performed each time the digital content is passed from one allowable level to a next allowable level in the social network.

3. The method of claim 1, wherein the one or more distribution parameters are received as input from the content producer.

4. The method of claim 3, further comprising a step of saving a profile of selected distribution parameters identified by the content producer.

5. The method of claim 1, wherein said creating step comprises preparing a configuration data file identifying the one or more distribution parameters per level selected by the content producer.

6. The method of claim 5, wherein the configuration data file is prepared using a rights expression language (REL) format.

7. The method of claim 5, wherein said creating step further comprises generating a unique key ID for identifying the distribution package and the digital content therein.

8. The method of claim 7, wherein said creating step further comprises encrypting the digital content using a license key seed.

9. The method of claim 8, wherein the distribution package includes the encrypted digital content, the configuration data file, the key ID and license key seed.

10. The method of claim 1, wherein the alteration comprises a degradation characteristic for applying to the digital content.

11. The method of claim 10, wherein said degradation characteristic comprises number of frames per second, file resolution, file size, file length, color, or bit rate.

12. The method of claim 1, wherein the alteration identifies an augmentation file for incorporating into and altering the digital content.

13. The method of claim 12, wherein the augmentation file comprises a visible watermark, an invisible watermark, an advertisement, a portion of text, or an additional video or audio segment.

14. The method of claim 1, wherein the digital content comprises one or more of a video, audio, photo, text or graphic file.

15. The method of claim 1, wherein the one or more distribution parameters further comprise an initial distribution list of content recipients.

16. The method of claim 1, wherein the one or more distribution parameters further comprise a maximum number of content recipients.

17. The method of claim 16, wherein the maximum number is a number of total content recipients.

18. The method of claim 16, wherein the maximum number is defined per level.

19. The method of claim 1, further comprising a step of sending the distribution package to content recipients.

20. The method of claim 19, wherein said sending step comprises:
  inviting the one or more content recipients as designated in an initial distribution list to view the digital content;
  verifying authenticity of each content recipient who subsequently requests access to the digital content; and
  initiating playback of an altered form of the digital content as defined by the at least one alteration definition for a given level.

21. The method of claim 1, further comprising a step of sending notification to the content producer each time a content recipient views a form of the digital content.

22. The method of claim 1, further comprising a step of sending notification to the content producer each time a content recipient further distributes a form of the digital content.

23. An article of manufacture comprising a computer-readable medium embodying program instructions for directing a computing device to:
  import, by the computing device, digital content for controlled distribution from a content producer to one or more levels of content recipients within a dynamically created social network;
  receive, by the computing device, input from the content producer, wherein the input corresponds to one or more distribution parameters that establish limitations on how the digital content is to be distributed to one or more content recipients based on a level that corresponds to the one or more content recipients, wherein the one or more distribution parameters include a maximum level number identifying a maximum level allowed between the content producer and a respective content recipient, wherein each content recipient of the digital content has a corresponding level of a plurality of levels determined based on a number of content recipients of the digital content in a distribution path of the digital content from the content producer to the respective content recipient, and also at least one alteration definition associated with at least one of the plurality of levels that defines a required alteration of the digital content prior to permitting a content recipient associated with the at least one of the plurality of levels to perceive the digital content;
  create, by the computing device, a distribution package comprising the digital content, the maximum level number, and the at least one alteration definition; and
  send, by the computing device, the distribution package to at least one second computing device.

24. The article of manufacture of claim 23, further comprising program instructions for directing a computing device to save a profile of selected distribution parameters identified by the content producer.

25. The article of manufacture of claim 23, further comprising program instructions for directing the computing device to prepare a configuration data file using a rights expression language (REL) to identify the one or more distribution parameters per level identified by the content producer.

26. The article of manufacture of claim 23, further comprising program instructions for directing the computing device to generate a unique key ID for identifying the distribution package and the digital content therein.

27. The article of manufacture of claim 23, further comprising program instructions for directing the computing device to encrypt the digital content using a license key seed.

28. The article of manufacture of claim 23, further comprising program instructions for directing the computing device to send notification to the content producer each time the one or more content recipients views or further distributes a form or the digital content.

29. The article of manufacture of claim 23, further comprising program instructions for directing the computing device to track viewing and usage of the digital content as it propagates through the social network.

30. The article of manufacture of claim 23, further comprising program instructions for directing the computing device to interface with a media playback device for viewing an altered form of the digital content.

* * * * *